Nov. 7, 1967
W. KOHLHAGEN
3,351,277
PRESETTABLE AND RESETTABLE COUNTER
Filed Jan. 16, 1967
2 Sheets-Sheet 1
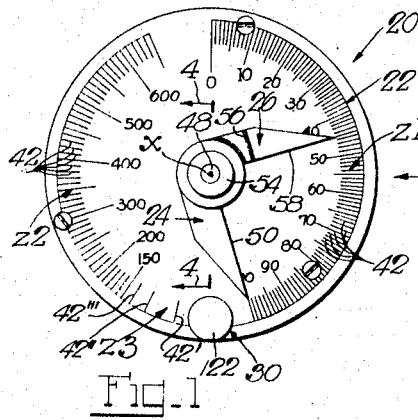
Fig.1
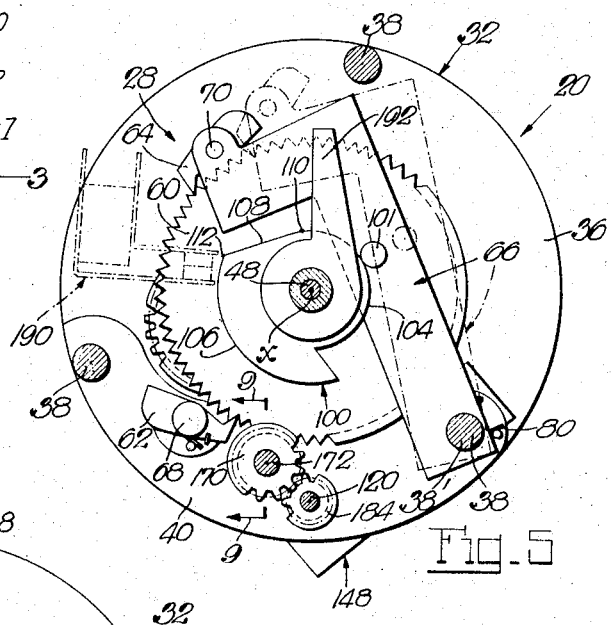
Fig.5
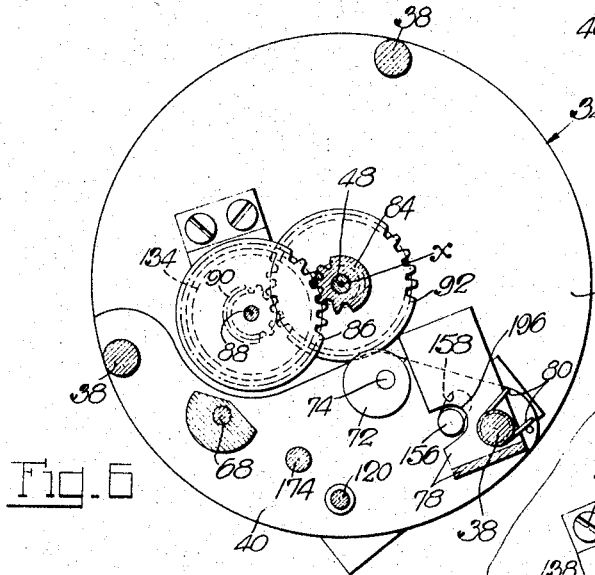
Fig.6
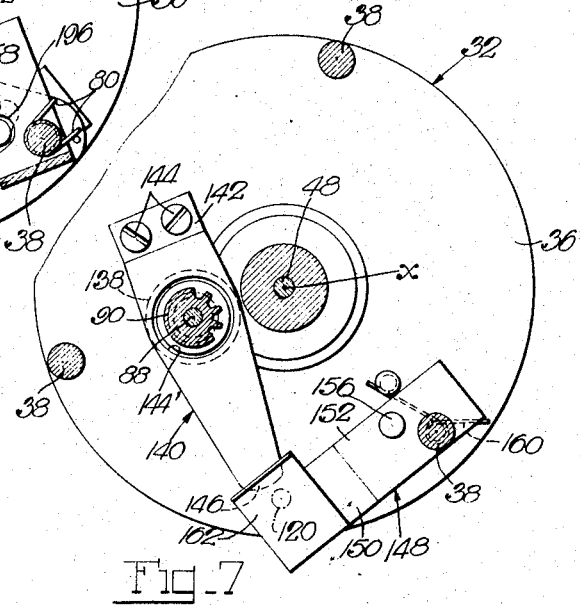
Fig.7
Fig.2
INVENTOR
Walter Kohlhagen
BY
Attorney.

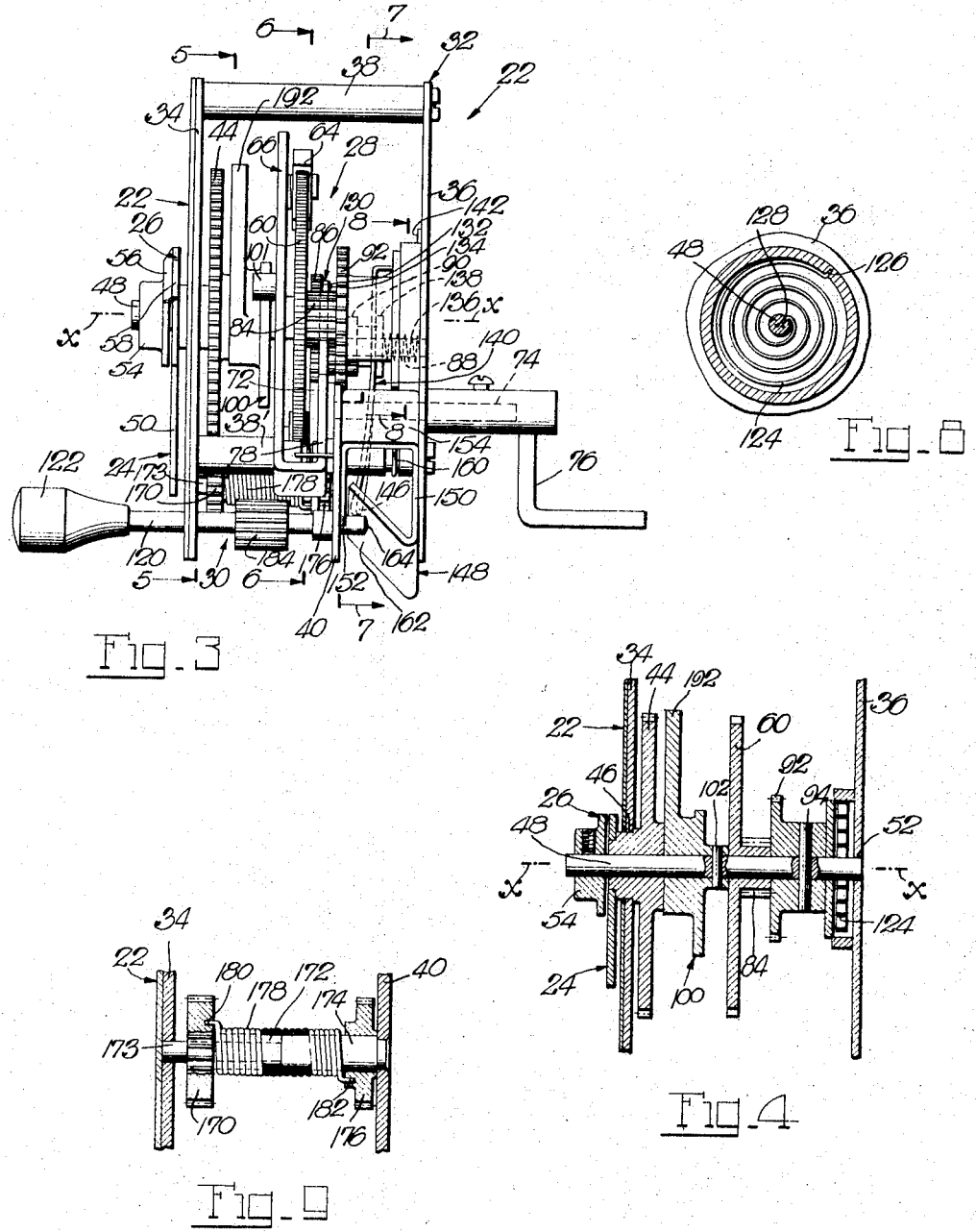

United States Patent Office

3,351,277
Patented Nov. 7, 1967

3,351,277
PRESETTABLE AND RESETTABLE COUNTER
Walter Kohlhagen, 818 Oakley Ave., Elgin, Ill. 62552
Filed Jan. 16, 1967, Ser. No. 609,478
21 Claims. (Cl. 235—132)

This invention relates to counters in general, and to presettable and resettable counters in particular.

The type of counter with which the present invention is concerned is presettable to any desired count within a given range, and will on cyclic operation of an actuator count off in increments, one for each cycle, to the lower limit of the range which is usually zero, whereupon the counter may be reset for a repeat count-off. These counters customarily have a stepping indicator for ready observation at all times of at least the progression of a count-off with progressive cyclic operation of the actuator.

It is among the objects of the present invention to provide a counter of this type which is of simple construction and lends itself to efficient and low-cost mass production, yet is highly accurate and reliable in its performance for the longest time.

It is another object of the present invention to provide a counter of this type which has an exceedingly wide count range throughout which the stepping indicator affords ready observation of any phase of a count-off in progress, yet the indicator steps near and to the usual zero end of a count-off are of adequate length to facilitate timely manipulation, or unfailing automatic operation by the stepping indicator, of a control, for example, to stop some operation at the end of the count-off.

It is a further object of the present invention to provide a counter of this type which for its stepping indicator has a preferably circular, graduated count-off dial of a designated count range and a therewith cooperating radial pointer, and the actuator is preferably a pawl-and-ratchet operated drive for the pointer of which the pawl is by cyclic operation oscillated back and forth to index the ratchet and thereby turn the pointer from any preset count position on the dial in count-off direction one step with each cyclic pawl operation, with the cyclic oscillation of the pawl being of smaller and greater amplitude over successive first and second stepping zones of the pointer, respectively, of which the first zone extends from the upper limit, and the second zone extends to the lower limit, of the count range of the dial, to thereby achieve the aforementioned movement of the indicator near and to the end of a count-off in steps of adequate length for the described purpose as well as to bring the exceedingly wide count range within operability of the counter.

Another object of the present invention is to provide a counter of this type in which the aforementioned cyclic oscillation of the pawl at different amplitudes is achieved in exceedingly simple manner by a cam which turns with the pointer and which within the aforementioned stepping zones of the pointer serves as a stop for the spring-urged advance of the pawl in ratchet-indexing direction through different distances, respectively, from an invariable retracted position into which it is after each advance returned on each cyclic operation of another actuator part. This other actuator part is advantageously a turnable eccentric of preferred one-revolution cyclic operability against which the pawl is spring-urged, so that the eccentric will on each initial cyclic half-revolution positively return the pawl to its retracted position, and will on each final cyclic half-revolution control the spring-urged ratchet-indexing advance of the pawl for different predetermined numbers of ratchet teeth depending on the angular position of the stop cam for the pawl.

A further object of the present invention is to provide a counter of this type in which the aforementioned cam has concentric high and low lobes and a connecting ridge leading tangentially from the low lobe and ascending to the high lobe at adequate inclination thereto to transfer the pawl by follower action therewith from the low lobe onto the high lobe on corresponding rotation of the cam. With this arrangement, the high and low lobes stop the indexing pawl at uniform smaller and larger primary distances from its retracted position over all of the aforementioned first and second pointer stepping zones, respectively, except over a transit region between these zones in which the ridge stops the indexing pawl at varying distances intermediate the stated primary distances from its retracted position, with the transit region being of the angular extent of the ridge.

It is another object of the present invention to provide a counter of this type in which the aforementioned graduations on the count-off dial are arranged to indicate on hand of the therewith cooperating pointer to best advantage any phase of a count-off from any preset count within the exceedingly wide count range of the counter. To this end, these graduations are over the count range of the dial arranged in three successive groups, of which the intermediate group extends over the aforementioned transit region and the graduations thereof are spaced apart at varying distances equal to the same multiples of the varying pointer steps through this transit region, the end group extending from the top limit of the count range on the dial to the transit region is coextensive with the part of the aforementioned first pointer stepping zone within which the pointer has the shortest and equal steps and the graduations thereof are spaced apart equally and at the closest distances equal to still greater multiples of these shortest pointer steps, while the other end group extending from the transit region to the lower limit, i.e. zero graduation, of the count range on the dial is coextensive with the part of the aforementioned second pointer stepping zone within which the pointer has the largest and equal steps and the graduations thereof are equally spaced at the largest distances which are preferably equal to these largest pointer steps. Additionally, key graduations of all three groups are advantageously marked with their actual count numbers for ready reference to the representative count numbers of all other graduations. Further, the dial arrangement alone sets the upper limit and, hence, also the breadth of the effective count range of the counter, and this dial arrangement affords an exceptionally wide count range, especially since the graduations are extended circularly preferably over most of the dial, yet it also affords a fairly accurate indication of the actual count at any phase of a count-off over all multiple-count graduations including those in the transit region, and it affords still better and entirely accurate indication of a progressing count-off when its perception becomes increasingly important, i.e., near and to the end of the count-off.

Another object of the present invention is to provide a counter of this type which affords the aforementioned exceedingly wide count range, yet the ratchet element of the aforementioned drive of the pointer is for all count-off steps of the latter operationally indexed through angular distances which advantageously are far greater than these pointer steps. This is achieved by arranging the drive from the ratchet to the pointer as a gear train of quite considerable reduction. With this arrangement, the ratchet may be of relatively small diameter well in keeping with the dimensions of the other parts of the counter, and its teeth may be limited in number and thus formed relatively wide and deep for their accurate and reliable cooperation with the indexing pawl for the longest time. Further, the operational oscillations of the pawl may, for all count-off steps of the pointer, be of sufficiently large amplitudes at which this pawl will with utmost accuracy and reliability index the ratchet so that the pointer will be in full alignment with the graduations on the dial at the conclusion of the counts which they represent.

It is a further object of the present invention to provide a counter of this type which in addition to the aforementioned "count-off" pointer has also a "preset" pointer that is settable, by turning toward the upper limit of the count range on the dial, to any desired count, and the count-off pointer will automatically follow the preset pointer to its set position in readiness for the count-off on subsequent cyclic operation of the actuator. To these ends, there is provided a set mechanism which on certain manipulation sets the preset pointer on the dial to a desired count, and the aforementioned pawl-and-ratchet operated drive of the count-off pointer includes a locking pawl for the ratchet to prevent rotation of this pointer opposite to its count-off direction, as well as a normally engaged clutch, and there is also provided a preloaded spring which is operatively connected with the count-off pointer to urge the same into abutting and following relation with the preset pointer into its set position and be reloaded on movement of the count-off pointer in count-off direction, but the spring is prevented from exerting its force in this fashion by the locking pawl on the ratchet, except when the clutch is disengaged and permits the exertion of the spring force despite the locking pawl, with the clutch being thus disengaged by the set mechanism on its aforesaid manipulation.

Another object of the present invention is to provide a counter of this type in which the aforementioned set mechanism will, on certain other manipulation at any time during or at the end of a count-off by the count-off pointer, cause resetting of the latter to its count starting position for a repeat count-off of the same set count. To this end, the set mechanism includes a manual, axially shiftable and turnable, element which on axial shift into an operative position and certain rotation while in operative position sets the preset pointer, and the aforementioned clutch is disengaged on mere shift of this element into its operative position so that in doing so without also turning the element the count-off pointer is by spring action reset to its count starting position.

A further object of the present invention is to provide a counter of this type in which the aforementioned set mechanism will on still other manipulation thereof turn the preset pointer back to any other, lower and even zero, count on the dial, and the count-off pointer, if in the path of the thus turning preset pointer, will by abutment with the latter be swept along. Such sweeping of the count-off pointer by the backing preset pointer against the formidable resistance, if not barrier, of the reduction-type drive of the count-off pointer is afforded and requires little force, by arranging the clutch in this drive remote from the operating ratchet thereof and in the form of a friction-type clutch which on joint backing of the pointers will readily slip.

It is another object of the present invention to provide a counter of this type in which the aforementioned reset spring for the count-off pointer is of adequate force to reset the latter with snap-like rapidity into abutment with the count-set pointer on manipulation of the set mechanism to this end, yet the ratchet-indexing pawl is protected against violent throw-back to and beyond its normal retracted position by the stop cam therefor with its described high and low lobes and connecting ridge which snaps back with the resetting count-off pointer. To this end, provision is made for retracting the indexing pawl fully out of reach of the stop cam on manipulating the set mechanism to disengage the clutch in the operating connection between the ratchet and count-off pointer, and to permit spring return of the indexing pawl into follower relation with the stop cam on reengagement of the clutch.

It is a further object of the present invention to arrange the aforementioned set mechanism in exceedingly simple structural form and so that on quite effortless manipulation of the same the count-set pointer will be brought to any desired count-set position on the dial, yet this pointer will in any set position be locked with entirely adequate firmness against even the slightest displacement from its set position under the quite considerable impact by the count-off pointer on any snap-like reset of the latter into abutment with the count-set pointer.

Another object of the present invention is to provide for accurate alignment of the count-off pointer in its intermittent rest positions between count-off sets with all dial graduations it encounters, so long as the count-set pointer is set in accurate alignment with the desired count graduation on the dial. With this arrangement, the progress of any count-off is accurately registered on the dial by the count-off pointer and the latter points unmistakably to each of the graduations that denote at the time the exact number of cyclic operations left to the end of the count-off.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a front view of a counter embodying the present invention;

FIG. 2 is a rear view of the same counter;

FIG. 3 is an enlarged side view of the counter as seen in the direction of the arrow 3 in FIG. 1;

FIG. 4 is an enlarged fragmentary section through the counter taken substantially on the line 4—4 of FIG. 1;

FIGS. 5, 6 and 7 are sections through the counter taken substantially on the lines 5—5, 6—6 and 7—7, respectively, of FIG. 3;

FIG. 8 is a fragmentary section through the counter taken on the line 8—8 of FIG. 3; and FIG. 9 is a fragmentary section through the counter taken on the line 9—9 of FIG. 5.

Referring to the drawings, the reference numeral 20 designates a counter having as its major operating components a dial 22, a count-set hand or pointer 24, a count-off hand or pointer 26, actuating mechanism 28 for the count-off pointer 26, and set mechanism 30 for the pointers 24 and 26. These operating components are carried by a support structure 32 which is formed in this instance by front and rear plates 34 and 36 that are held in spaced parallel relationship by pillars 38, and an intermediate plate 40 which is suitably anchored to two of the pillars 38. The counter has an axis $x$ which is its major operating axis.

The dial 20 is in this instance in the form of a disc which is attached to the front plate 34 and bears graduations 42 that extend circularly about the axis $x$ and define a count range which in the present example extends from an upper limit of 650 to a lower limit of 0. It will be noted that the graduations 42 are arranged differently over three successive zones of the count range. Thus, successive graduations in a lower count zone $z1$ from 0 to 100 are equally spaced and denote single counts, successive graduations in an upper count zone $z2$ from 150 to 650 are also spaced equally but at greater distances than those in the lower zone $z1$ and they denote a certain multiple of a single count which in this example is 10 counts, while successive graduations in an intermediate count zone or transit region $z3$ from 100 to 150 are spaced at varying distances and denote the same multiple of a single count as successive graduations in the upper zone, namely 10 counts. As shown, many graduations are marked with key count numbers which they represent in the count range of the dial.

The count-set pointer 24 is movable over the dial by being turnable about the axis $x$. To this end, the pointer 24 is suitably mounted on the hub of a gear 44 which with its hub is journalled in an aperture 46 in the front plate 34 (FIG. 4) and finds further support on an operating shaft 48 in hereinafter explained manner. The gear 44 is immediately behind the front plate 34, but its hub extends through the plate aperture 46 and through a central aperture in the dial and carries in front of the latter the count-set pointer 24 (FIG. 4). As shown in FIG. 1 the pointer 24 has a pointed tip for accurate and best perceptible cooperation with the dial graduations, and the side or edge 50 of this pointer extends from this pointed tip inwardly radially with respect to the axis $x$ for a reason which will become obvious hereinafter.

The count-off pointer 26 is similarly movable over the dial by being turnable about the axis $x$. To this end, the pointer 26 is carried by the operating shaft 48 which is turnable about the axis $x$ and journalled near its forward end in the hub of the gear 44 and with its rear end in an aperture 52 in the rear plate 36 (FIG. 4). It is by virtue of the partial journal support of the shaft 48 in the hub of the gear 44 that the latter finds added journal support on this shaft 48 for its rotational movement about the axis $x$. The count-off pointer 26 has a hub 54 which by a set screw is secured to the forward end of the shaft 48 in front of the count-set pointer 24, but the outwardly extending arm portion of this count-off pointer is at 56 rearwardly offset from its hub 54 (FIGS. 1 and 3) so as to be in the same plane of operation as the count-set pointer 24. With this arrangement, the pointers 24 and 26 are in each other's path on relative turning movement toward each other and will come into abutment with each other on relative turning movement against each other, with the edge 50 of the pointer 24 being then in abutting engagement with the edge 58 of the other pointer 26. As shown in FIG. 1, the count-off pointer 26 also has a pointed tip and its edge 58 extends from this pointed tip inwardly radially with respect to the axis $x$. Therefore, in any count-start position of the count-off pointer 26, in which the same abuts the count-set pointer 24, both pointers are with their pointed tips in accurate alignment with any particular dial graduation to which the count-set pointer 24 has been accurately set in a manner explained hereinafter.

The actuating mechanism 28 for the count-off pointer 26 comprises a one-way device with companion driving and driven sections of which the driven section is turnable only in one direction, a cyclically operable element which on each cyclic operation causes the driving section to index the driven section one step in this one direction, and an operating connection between the driven section and count-off pointer 26 to step the latter in anticlockwise, count-off, direction in FIG. 1 with each step of the driven section. The one-way device is in this instance a ratchet-and-pawl arrangement (FIG. 5) of which the driven section is a ratchet wheel 60 with a locking pawl 62, and the driving section is an indexing pawl 64 on a carrier 66. As best shown in FIG. 4, the ratchet wheel 60 is with its hub freely turnable on the operating shaft 48, and the locking pawl 62 is at 68 pivoted on the intermediate support plate 40 and spring-urged into engagement with the ratchet teeth to lock the ratchet wheel 60 against rotation in clockwise direction but permit its correct operational indexing steps motions in anticlockwise direction (FIG. 5) which in this instance is identical with the count-off direction of the count-off pointer 26 in FIG. 1. The indexing pawl 64 is at 70 pivotally mounted at one end of its carrier 66 which in this instance is an arm that is with its other end pivotally mounted on one of the pillars 38, in this instance the pillar 38' (FIGS. 3 and 5), with the indexing pawl 64 being spring-urged into engagement with the ratchet teeth. The pawl carrier 66 is thus swingable about the pillar 38' and has operational oscillation thereabout, with the pawl 64 indexing the ratchet wheel 60 in correct anticlockwise direction on each swing of its carrier in anticlockwise direction (FIG. 5), and overriding the teeth of the locked ratchet wheel on each swing of its carrier in the opposite direction.

The cylically operable element for operating the pawl carrier 66 is in this instance an eccentric 72 of exemplary one-revolution cyclic operation (FIGS. 3 and 6). To this end, the eccentric 72 is carried by a stub shaft 74 which is journaled in suitable bearing apertures in the intermediate and rear support plates 40 and 36, with the eccentric 72 being carried by the end of the stub shaft 74 which extends forwardly of the intermediate plate 40, and the other end of this stub shaft extending rearwardly beyond the rear plate 36 for the mount thereon of an exemplary crank arm 76 for operation of the eccentric 66. The arm-type pawl carrier 66 has at its pivoted end an L-shaped formation 78 which by a spring 80 is urged into follower relation with the eccentric 72 (FIGS. 3 and 6). It is thus apparent from FIGS. 5 and 6 that in the counter described so far the pawl carrier 66 will, on each cyclic one-revolution of the eccentric 72 in exemplary anticlockwise direction (FIG. 6), have a single oscillation of a given amplitude, with the operational swing of this carrier in anticlockwise, ratchet-indexing, direction being under the urgency of the spring 80 but controlled by the eccentric 72, and the operational swing of this carrier in the opposite direction into the invariable retracted dot-and-dash line position in FIG. 5 being by positive action of the eccentric 72 and against the force of the spring 80.

The operating connection between the ratchet wheel 60 and the count-off pointer 26 is a gear train which advantageously is of reduction-type, with the ratchet wheel 60 being the fastest element of the connection. To this end, the ratchet wheel 60 is in this instance formed with a pinion 84 (FIGS. 3, 4 and 6) which is in mesh with a turnable gear 86 on a stub shaft 88 that is fixedly mounted in the rear support plate 36 and extends forwardly therefrom, with this stub shaft 88 also turnably supporting a pinion 90 which turns in unison with the gear 86 and is in mesh with a gear 92 that is pinned at 94 to the operating shaft 48 for rotation therewith, with this shaft 48 carrying the count-off pointer 26 as already explained.

With successive dial graduations in the different count zones $z1$ to $z3$ denoting different count numbers as explained, it stands to reason that the count-off pointer 26 must have count-off steps of different lengths in these different count zones. Thus, with each cyclic revolution of the eccentric 72 the pointer 26 must be moved in count-off direction through one step of a distance which must exactly correspond to a one-count according to the dial graduations in any of the count zones in which this pointer happens to be at the time. Accordingly, in the exemplary dial arrangement of FIG. 1, the count-off pointer 26 must during count-off in the count zone $z1$ respond to each cyclic performance of the eccentric 72 with a step through a distance exactly equal to the spacing of the graduations in this zone because successive ones of these graduations denote a one-count, while the same pointer must during count-off in the count zone $z2$, for example, respond to each cyclic performance of the eccentric 72 with a step through a distance exactly equal to one-tenth of the spacing of the graduations in this zone because successive ones of these graduations denote a ten-count. The count-off steps of the pointer 26 in the intermediate count zone $z3$ are still further different as will be explained hereinafter. For exact coordination of the count-off steps of the pointer 26 with the graduations in the different count zones $z1$ to $z3$, there is provided a control cam 100 (FIGS. 3 to 5) which at 102 is pinned to the operating shaft 48 and, hence, turns with the pointer 26. Thus, while the eccentric 72 will, on each cyclic revolution, control the spring-urged advance of the pawl carrier 66 in ratchet-indexing direction and positively return this carrier to its invariable retracted position, it is the cam 100 which stops this pawl carrier in different advance positions for indexing steps of the ratchet wheel 60 that bring about correct count-off stepping of the pointer 26 in the different count zones z1 to z3. To this end, the pawl-carrier 66 has a follower pin 101 for cooperation with the cam 100, and this cam has a low lobe 104, a high lobe 106 and a connecting ridge 108 (FIG. 5). The low and high lobes 104 and 106 are concentric about the axis $x$ and the ridge 108 is preferably straight and leads tangentially from the low lobe 104 and ascends to the high lobe 106. Thus, with the pointer 26 being in the lower count zones z1 in the example shown in FIG. 1, the low lobe 104 of the cam 100 is the active stop for the pawl-carrier 66 to terminate each spring-urged advance of the latter from its invariable retracted position through a distance, in this case maximum operational distance, at which the ratchet wheel 60 is indexed for a count-off step of the pointer 26 exactly equal to the spacing of the graduations in this lower count zone z1. On the other hand, if the pointer 26 would be within the upper count zone z2 (FIG. 1) the high lobe 106 of the cam 100 would be adjacent the follower pin 101 on the pawl carrier 66 and be the active stop for the latter to terminate each spring-urged advance of the same from its invariable retracted position through a distance, in that case minimum operational distance, at which the ratchet wheel 60 is indexed for a count-off step of the pointer 26 which is exactly equal to one-tenth of the spacing of the graduations in this upper count zone z2. The coordination of the cam 100 with the follower pin 101 on the pawl carrier 66 is such that the end 110 of the low cam lobe 104 from which the cam ridge 108 leads tangentially is in follower relation with the pin 101 on the pawl carrier when the pointer 26 aligns with the top graduation 100 of the lower count zone z1, and the end point 112 of the high cam lobe 106 will be in follower relation with the pin 101 on the pawl carrier when the pointer 26 aligns with the bottom graduation 150 of the upper count zone z2. Accordingly the cam ridge 108 will be the active stop for the pawl carrier 66 on its spring-urged advances when the pointer 26 is within the intermediate count zone or transit region z3. Assuming then that the pointer 26 starts its count-off at the 150 graduation at which the end point 112 of the high cam lobe 106 would be in follower relation with the pawl carrier 66, the cam ridge 108 will on successive indexings of the ratchet wheel 60 permit progressively longer spring-urged advances of the pawl carrier with ensuing progressively longer count-off steps of the pointer 26 to the dial graduation 100 at which the leading end point 110 of the low cam lobe 104 assumes control over the next succeeding count-off step of the pointer 26 through the maximum operational distance, i.e., from alignment with the 100 graduation to alignment with the next lower graduation, denoting 99, with further succeeding count-off steps of this pointer to the end of the count-off, i.e., 0 dial graduation, being through the same maximum operational distance, as will be readily understood. However, it is by virtue of the explained progressively larger count-off steps of the pointer 26 through the transit region z3 of the dial that successive graduations within this region, which denote exemplary ten-counts as already explained, are spaced apart at varying distances, with the graduations 42′, 42″ and 42‴ denoting the count numbers 120, 130 and 140, respectively.

To set or reset the pointer 26, the set mechanism 30 includes a stem 120 which is axially slidable in suitable apertures in the front and intermediate support plates 34 and 40, and the same carries at the front of the dial 22 a knob 122 for manipulation. Actual turning of the pointer 26 in clockwise reset direction (FIG. 1) is by the force of a preloaded spring 124 (FIGS. 4 and 8) which is with its ends anchored at 126 and 128 to the rear support plate 36 and the operating shaft 48, respectively. This preloaded spiral spring 124 will unwind to some extent when turning the pointer 26 in reset direction, but will be rewound by this pointer through the shaft 48 when the pointer is turned in the opposite, count-off direction (FIGS. 1 and 8). However, the pointer 26 is ordinarily locked against rotation in reset direction by the ratchet wheel 60 which by the locking pawl 62 is arrested against rotation in the corresponding direction (FIG. 5). Therefore, in order to permit resetting of the pointer 26 by the force of the spring 124, provision is made temporarily to interrupt the operating connection between the ratchet wheel 60 and the pointer 26. To this end there is interposed in this connection a normally engaged clutch 130 (FIG. 3) which on disengagement frees the operating shaft 48 from the ratchet wheel 60 for spring-urged movement of the former and of the pointer 26 thereon in reset direction. The clutch 130 is preferably and advantageously of friction type, having companion driving and driven elements 132 and 134, with the driving element 132 being a friction face of the gear 86, and the driven element 134 being a friction disc which is turnable and axially slidably on the stub shaft 88 and normally urged by a spring 136 into clutch-engaged frictional contact with the friction face of the gear 86 (FIGS. 3 and 6). In this instance, the pinion 90 is turnable and axially movable with the friction disc 134, and suitably secured to this pinion is a collar 138 for cooperation with a shift member 140 for clutch disengagement (FIGS. 3 and 7). The shift member 140 is in this instance a leaf-type arm having an offset end 142 with which it is at 144 mounted on the rear support plate 36, with the remainder of this arm having some resiliency and normally assuming the position shown in FIG. 3 in which it permits engagement of the clutch 130. The arm 140 has a clearance aperture 144′ for the pinion 90, but this arm is in overlap relation with the collar 138 on the pinion (FIG. 7) for cooperation with the same to disengage the clutch 130. On depressing this arm 140 at its forward end 146 toward the rear support plate 36 (FIGS. 3 and 7), the same will through the collar 138 shift the friction disc 134 toward the rear support plate 36 sufficiently to cause clutch disengagement, with the clutch being reengaged by the spring 136 on releasing the depressed arm 140 for return to its normal position in FIG. 3. Of course, while the clutch 130 is in this instance interposed in the operating connection between the ratchet wheel 60 and the pointer 26, this clutch 130 or an equivalent clutch may be arranged elsewhere as long as its disengagement permits spring-urged resetting of the pointer 26.

The aforementioned stem 120 of the set mechanism 30 is adapted to cause disengagement of the clutch 130 on shifting this stem into a certain axial position. However, such shift of the stem 120 will bring about clutch disengagement through intermediation of another arm 148 (FIGS. 3 and 7) which is actuated by the stem for this purpose as well as for another purpose to be described hereinafter. The arm 148 is in this instance U-shaped, having the spaced legs 150 and 152 and a connecting yoke 154 (FIGS. 3 and 7), and this arm 148 is pivoted on the pillar 38 and interposed with its legs 150 and 152 between the rear and intermediate support plates 36 and 40. The arm 148 carries a pin 156 (FIGS. 6 and 7) which projects into an arcuate groove 158 in the intermediate support plate 40, and is by a spring 160 normally urged into the inactive position shown in FIG. 7 in which its pin 156 is in stop engagement with one end of the slot 158 (FIG. 6). The leg 150 of this arm 148 is at its free end provided with an inclined cam-lug formation 162 which is in operative alignment with the stem 120. As is apparent from FIGS. 3 and 7, the clutch shift arm 140 normally projects with its free end 146 underneath the high end of the cam lug 162 on the other arm 148 in its inactive position. However, on manually shifting the stem 120 toward the rear support plate 36, its active end 164 will cooperate with the cam lug 162 in turning the arm 148 clockwise (FIG. 7), whereby by cam action of the cam lug 162 on the free end 146 of the clutch shift arm 140 the latter will be depressed from its normal position and thereby cause disengagement of the clutch 130 as already explained. Of course, when the stem 120 is released, the arm 148 will by action of the spring 160 be returned to its inactive position (FIG. 7) and the clutch shift arm 140 will then also be permitted to return to its normal position in which the clutch 130 is engaged (FIG. 3). Therefore, in thus axially shifting the stem 120 toward the rear support plate 36, the clutch 130 will be disengaged, with ensuing release of the pointer 26 for its snap-like movement by the preloaded spring 124 in reset direction into abutting engagement with the count-set pointer 24 in any count-set position of the latter on the dial.

The set mechanism 30 is also adapted for manipulation to turn the count-set pointer 24 in either direction over the dial 22 to any desired count-set position. To this end, the pointer 24 is carried by the aforementioned gear 44 (FIG. 4) with which meshes a gear 170 (FIGS. 3 and 9) which in this instance is fast on a rotary sleeve 172 on a diametrically reduced shank 173 of a stub shaft 174 that is fixedly mounted in the intermediate and front support plates 40 and turnably supports a gear 176. Surrounding the sleeve 172 and fixed shaft 174 is a coil spring 178 of unidirectional helical turns which is anchored with its ends at 180 and 182 to the respective gears 170 and 176. Either of the gears 170 and 176 is adapted to be driven in a certain direction by a fast pinion 184 on the stem 120 which to this end is supported in the front and intermediate support plates 34 and 40 for turning movement as well as for axial movement. Thus, on shifting the stem 120 forward for mesh of its pinion 184 with the gear 170 and then turning the stem 120 at the knob 122 anticlockwise (FIG. 1), gear 170 will be driven clockwise (FIG. 5) and the gear 44 will be driven in the opposite direction in which its pointer 24 will be turned anticlockwise in FIG. 1, i.e., towards the 0 graduation of the dial, to any desired new and lower count-set position. In thus setting the count-set pointer 24 back on the dial, the drive of the gear 170 by the pinion 184 is in a direction in which the turns of the spring 178 tend to open up on the fixed stub shaft 174, whereby the other gear 176 will by this spring be made the follow gear 170 in its rotation. However, if it were attempted to turn the knob 122 on the stem 120 in the direction opposite to that described for turning the count-set pointer 24 back on the dial, the rotational force exerted on the gear 170 would be such as to cause the turns of the spring 178 to close and immediately bind on the fixed stub shaft 174. Accordingly, with the pinion 184 on the stem 120 being in mesh with the gear 170, any attempt at turning the knob 122 in clockwise direction (FIG. 1) to effect turning movement of the pointer 24 in the same direction to a higher count-set position, is doomed to failure because of the explained immediate binding of the spring turns on the fixed stub shaft 174. Should the count-set pointer 24 in its anticlockwise turning movement toward the 0 dial graduation encounter the count-off pointer 26, the latter will be swept along with the count-set pointer, in which event the described friction clutch 130 will slip because it offers less resistance to turning the knob 122 than would the described reduction gear train from the operating shaft 48 to the ratchet wheel 60, as will be readily understood.

In order to turn the count-set pointer 24 to a higher count-set position on the dial, the stem 120 is axially shifted toward the rear support plate 36 to bring its pinion 184 into mesh with gear 176, whereupon the knob 122 is turned in clockwise direction (FIG. 1) with ensuing turning of the pointer 24 in the same direction. In thus turning the knob 122, the drive from the pinion 184 into the therewith meshing gear 176 is such as to loosen or open the turns of the spring 178 on the fixed stub shaft 174 sufficiently to cause this spring to transmit the rotary motion of the bear 176 to the gear 170 for the correct clockwise drive of the count-set pointer 24 (FIG. 1) via its gear 44. However, if it were attempted to turn the knob 122 in the wrong, anticlockwise, direction (FIG. 1), while the pinion 184 is in mesh with the gear 176, the count-set pointer 24 would not respond in turning in the same anticlockwise direction over the dial, because the turns of the spring 178 would then immediately bind or freeze on the fixed stub shaft 174. It thus follows from the preceding that the count-set pointer 24 is turnable by the knob 122 in opposite directions in different axial positions, respectively, of the stem 120, and in this instance turning movement of this pointer 24 in clockwise and anticlockwise direction is achieved by turning the knob 120 in the same directions (FIG. 1).

In axially shifting the stem 120 toward the rear support plate 36 to mesh its pinion 184 with the gear 176 for subsequently turning the knob 122 to turn the count-set pointer 24 clockwise (FIG. 1) as described, such axial shift of the stem 120 also causes, as previously explained, disengagement of the friction clutch 130 and release of the count-off pointer 26 for snap-like clockwise rotation into abutment with the count-set pointer by the force of the spring 124 which acts on the operating shaft 48 that carries the count-off pointer 26 (FIGS. 4 and 8). Accordingly, the count-off pointer 26 will on the just described axial shift of the stem 120 be spring-snapped clockwise in FIG. 1, into abutment with the count-set pointer 24, and will be spring-held against the latter pointer and also follow the same in clockwise direction (FIG. 1) if the knob 122 is also turned to effect such rotation of the count-set pointer 24, as will be readily understood.

The reset spring 124 for the count-off pointer 26 is advantageously quite powerful to achieve quickest possible, snap-like resetting of this pointer so as not to lose even a single count on a repeat count-off as will become obvious hereinafter. Such powerful snap-like reset of the pointer 26, however, entails rather forceful impact of the same with the count-set pointer 24 on its engagement with the latter, wherefore it is important that the thus heavily impacted count-set pointer 24 will not yield the slightest from its set position in accurate alignment with the selected count graduation on the dial since the count-off pointer 26 would otherwise be out of accurate alignment with the dial graduations which it encounters in its intermittent rest positions between count-off steps and which denote the actual counts remaining to the end of the count-off. Even the slightest yield of the count-set pointer 24 under the heavy impact of the resetting count-off pointer 26 is prevented in structurally exceedingly simple and functionally most effective manner by the spring 178. Thus, the heavy impact force of the resetting pointer 26 on the count-set pointer 24 will through intermediation of the meshing gears 44 and 170 be transmitted to the spring 178 in a direction to effect immediate binding of the spring turns on the fixed stub shaft 174, with such binding of the spring to this stub shaft being characteristically as instantaneous and unwielding as though the count-set pointer 24 were on impact positively locked in its set position.

While in the present example the shaft support of the gears 170 and 176 is provided in rotary and fixed sections 172 and 174, respectively, the same could obviously be in the form of a single fixed shaft, in which case both gears 170 and 176 would be independently turnable on such fixed shaft in order that the set drive would operate exactly as described above.

The present counter is suited for many purposes involving counting, such as, for example, to afford a ready control over an operating run of a desired number of cyclic operations of a machine or machines. To the latter end, the machine or machines need merely be operatively connected with the exemplary crank 76 of the counter to turn the same through a cycle of one revolution for each cyclic machine operation. Thus, once the counter is set for a desired number of cyclic machine operations, i.e. the number 100 in the example shown in FIG. 1, and the count-off pointer 26 has been set to its count-start position in abutment with the count-set pointers 24 in FIG. 1, the machine or machines may be started and the pointer 26 will for each cyclic machine operation step in count-off direction through a distance which is equal in this instance to the single-count spacing of the graduations in the lower count zone z1 of the dial. The count-off pointer 26 is in FIG. 1 shown in alignment with the 45 graduation of the idal, denoting that the machine or machines will have to go through 45 remaining cyclic operations to complete the set number of cyclic operations, namely 100. As the count-off pointer 26 nears the 0 dial graduation, an attendant, such as the one attending the machine or machines, will pay increasing attention to the counter and cause stopping of the machine or machines just when the pointer 26 steps into alignment with the 0 dial graduation. Of course, if the count-set pointer 24 has been set to a higher count, say one in the upper count-zone z2 of the dial, the count-off pointer 26 will, on count-off, have the aforementioned shortest steps to the lower limit of the upper count zone z2, and will have the aforementioned increasingly longer steps through the transit region z3 of the dial, and will finally have the longest steps through the lower count zone z1 of the dial, as will be readily understood.

Provisions may also be made automatically to stop operation of a machine or machines with which the counter is operatively connected. To this end, there is suitably carried by and in rear of the front support plate a switch 190, show in dot-and-dash lines in FIG. 5 with which is associated an arm 192 that is in this instance formed integrally with the earlier described cam 100 (FIGS. 3 to 5) which turns with the operating shaft 48 and, hence, with the count-off pointer 26. The switch 190, which may be connected in the power circuit of the machine or machines, is normally closed for operation of the latter, and the coordination between this switch and the arm 192 is such that the latter will open the switch when the count-off pointer 26 moves into alignment with the 0 dial graduation and thereby stop operation of the machine or machines until this pointer 26 is reset for a new count-off. Of course, movement of the pointer 26 into alignment with the 0 dial graduation will usually be its last step in an orderly count-off, but such movement of this pointer to the 0 graduation may also be in consequence of a deliberate interruption of a count-off when the count-set pointer 24 is in the described manner turned anticlockwise to the 0 graduation (FIG. 1) and on encountering the count-off pointer 26 in any count-off position sweeps the latter pointer along.

The count-set pointer 24 may also be set in described manner to a new lower-count position at any time (FIG. 1) without in any way disturbing the count-off pointer 26, even to the conclusion of a count-off by the latter, unless in the course of thus setting the count-set pointer 24 the latter should encounter the other pointer and sweep it along. On the other hand, in setting in described manner the count-set pointer 24 to a new, higher count on the dial at any time, the count-off pointer 26 will from any position immediately be forced by spring action into abutment and following relation with the count-set pointer 24.

It has already been explained that resetting of the count-off pointer 26 is preferably snap-like and forceful by the action of the spring 124. However, such snap-like resetting of the count-off pointer would certainly cause undue wear and also early breakdown of the pawl-and-ratchet mechanism 64, 60 if the pawl carrier 66 would be within follower reach of the control cam 100 on a reset of the count-off pointer to a count-start position somewhere within the upper count zone z2 of the dial. Obviously, during a reset of this pointer to the exemplary extent just mentioned, the ascending ridge 108 of the control cam 100 would pass the follower pin 101 on the pawl carrier 66 in clockwise direction (FIG. 5) at the same high speed as the resetting pointer, wherefore the pawl carrier 66 would be bounced rather violently rearwardly toward and beyond its dot-and-dash line retracted position in FIG. 5 by the thus passing cam ridge 108 if the follower pin 101 on the pawl carrier were then in the path of this cam ridge. Therefore, in order to avoid such a clash between the control cam 100 and the pawl carrier 66 in any event, provision is made to retract the pawl carrier from follower reach by the control cam during any reset of the count-off pointer 26. To this end, the arm 148 will, on axially shifting the stem 120 to the right (FIG. 3) to the position in which the friction clutch 130 will just be disengaged, be cammed by this stem from the inactive position in FIG. 7 clockwise into another position in the course of which its pin 156 will come into engagement with the edge 196 of the follower portion 78 of the pawl carrier 66 and turn the latter into a position like or similar to its dot-and-dash line position in FIG. 5 in which its follower pin 101 is out of reach of any portion of the control cam 100. This will be the normal procedure when at the end of a count-off to the 0 graduation the eccentric 72 stops in the position shown in FIG. 6, especially when a switch such as that indicated at 190 in FIG. 5 is operated in timed relation with the counter to stop cyclic operation of the eccentric 72 at that time. In the axial position of the stem 120 in which the clutch 130 is just disengaged its pinion 184 is preferably just short of mesh with the gear 176 so that meshing of the same for mere resetting of the count-off pointer 26 for the same repeat count-off is unnecessary. Also, resetting of the count-off pointer 26 at any time during a cyclic operation of the eccentric 72 is, of course, possible, in which case the arm 148 will, on axial shift of the stem 120 for disengagement of the clutch 130, assume the retraction of the pawl carrier 66 out of follower reach of the control cam 100 when in the course of its cammed clockwise displacement from the inactive position in FIG. 7 it encounters the pawl carrier in any position. The pawl carrier 66 will, of course, be spring-returned into follower relation with the control cam 100 on the return shift of the stem 120 to the left in FIG. 3 after a reset of the count-off pointer 26. Of course, axial shift of the stem 120 to the extent of meshing its pinion 184 with the gear 176 in preparation for setting the count-set pointer 24 to a higher count on the dial, will separate the companion elements of the clutch 130 still further and will also cause still further retraction of the pawl carrier 66 from the control cam 100, as will be readily understood.

It is also within the operability of the present counter to have the count-off pointer 26, on its resetting at any time during or between cyclic operations of the eccentric 72, not only start its count-off with the very first cyclic operation of this eccentric after resetting of this pointer, but to come in the course of its step-by-step count-off to intermittent rest positions in which the same is in accurate alignment, and not in the least out of alignment, with all dial graduations it encounters in its count-off. Thus, in normal operation of the counter with the exemplary control switch 190 (FIG. 5), the eccentric 72 will at the end of a count-off to the 0 graduation come to rest in a position like or similar to that shown in FIG. 6. Now, if the count-set pointer 24 is in accurate alignment with the set count graduation on the dial, as it should be, and on shifting the stem 120 for disengagement of the clutch 130 and immediately releasing this stem for return shift, the count-off pointer 26 will fly to its count-start position and the pawl carrier 66 will be returned into follower relation not only with the control cam 100 but also with the eccentric 72 in more than ample time to be actuated by the latter on the initial half of its first cyclic revolution which results in retraction of the pawl carrier to its retracted dot-and-dash line position in FIG. 5, so that on the second half of this first revolution of the eccentric the indexing pawl 64 will index the ratchet wheel 60 the correct distance for an exact one-count step of the count-off pointer 26 according to the applicable dial graduations. Accordingly, if the recount starts anywhere in the lower count zone $z1$ of the dial, say with the exemplary 100 graduation (FIG. 1), the count-off pointer 26 will on the first cyclic operation of the eccentric 72 step from alignment with this 100 graduation into exact alignment with the next graduation denoting 99, and this pointer will on all successive cyclic operations of this eccentric come into exact alignment with all successive dial graduations it encounters in the count-off. Of course, under the same conditions the count-off pointer 26 will from any other count-start position, such as one in the upper count zone $z2$, come in the count-off to intermittent rest positions in which it will be in exact alignment with all dial graduations it encounters, though the pointer will within this upper count zone $z2$ step ten times in order to move from exact alignment with one graduation into exact alignment with the next graduation, as will be readily understood. Of course, the achievement of counting the very first cyclic operation of the eccentric 72 after a reset of the count-off pointer 26 and subsequent stepping of this pointer into exact alignment with all dial graduations it encounters is entirely within reach if reset of this pointer is undertaken at any other time, and even during cyclic operation of the eccentric 72, it being merely necessary to meet the requirements of accurate alignment of the count-set pointer 24 with the set count dial graduation and timed manipulation of the stem 120 for a reset of the count-off pointer 26 while the eccentric is in any position within its initial half-cycle for retraction of the pawl carrier 66 to its retracted position, as will be readily understood.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a counter, the combination of a count-set member and a count-off element movable to and from abutment with said member in reset and count-off directions, respectively; actuating mechanism for said element, having a one-way device with companion driving and driven sections of which said driven section is turnable only in one direction, and an operating connection between said driven section and element and including a normally engaged clutch for moving said element in said count-off direction on turning said driven section, with said driving section being cyclically operable and acting on each cyclic operation to turn said driven section one step; a preloaded spring operatively connected with said element to urge the latter in said reset direction and be reloaded on movement of said element in said count-off direction; and means operable to disengage said clutch, whereby on clutch disengagement said spring will force said element into abutment with said member.

2. In a counter, the combination of a count-set member and a count-off element independently movable in forward and rearward directions and being in each other's path on relative movement toward each other; setting mechanism including a movable setter, operable only on first manipulation of said setter into a certain position and other second manipulation of the same while in said certain position to move said member in said forward direction into a desired count-set position; actuating mechanism for said element, having a one-way device with companion driving and driven sections of which said driven section is turnable only in one direction, and an operating connection between said driven section and element and including a normally engaged clutch for moving said element in said rearward direction on turning said driven section, with said driving section being cyclically operable and acting on each cyclic operation to turn said driven section one step; a preloaded spring operatively connected with said element to urge the latter in said forward direction and be preloaded on movement of said element in said rearward direction; and means operated by said setter when in said certain position to disengage said clutch, whereby on clutch disengagement said spring will reset said element against said member and will also keep said element in following relation with said member if the latter is turned in said forward direction on said second manipulation of said setter.

3. The combination in a counter as in claim 2, which further comprises a graduated dial of a given count range with upper and lower limits over which said member and element are movable, with said element being intermediate said member and lower dial range limit and approaching the latter in its one-step movements in said rearward direction.

4. The combination in a counter as in claim 2, in which said operating connection between said driven section and element is of speed-reduction type, with said driven section being the fastest element of the connection and said clutch being of friction-type and a slower element of the connection, and there is further provided a device operable to move said member in said rearward direction, with said clutch slipping if during such movement of said member the latter encounters said element and sweeps it along.

5. The combination in a counter as in claim 2, in which said operating connection between said driven section and element is of speed-reduction type, with said driven section being the fastest element of the connection and said clutch being of friction-type and a slower element of the connection, and said setting mechanism is operable on manipulation of said setter other than said first and second manipulation thereof to move said member in said rearward direction, with said clutch slipping if during such movement of said member the latter encounters said element and sweeps it along.

6. In a counter, the combination of a count-set member; a count-off element movable over a given range to and from abutment with said member in reset and count-off directions, respectively, with said member defining one limit of said range; actuating mechanism for said element, having a one-way device with companion driving and driven sections, of which said driven section is turnable only in one direction and said driving section is oscillatable in advance and retract directions and spring-urged in said advance direction in which to turn said driven section, a disconnectible but normally connected operating connection between said driven section and element for moving the latter in said count-off direction on turning said driven section, a cyclically operable part acting on successive parts of each cyclic operation to move said driving section in said retract direction to an invariable retracted position and permit its spring-urged movement in said advance direction, respectively, and a cam turning with said element and serving as a stop for said driving section in said advance direction at distances from said retracted position which in the movement of said element from said one limit to the other limit of said range vary from smaller to larger, respectively; and means operable to disconnect said connection for independent movability of said element in either direction.

7. In a counter, the combination of a dial with graduations defining a given count range with upper and lower limits; first and second pointers cooperating with said dial and independently movable over said count range in forward and rearward directions toward said upper and lower range limits, respectively, with said second pointer being between said first pointer and lower range limit; means for moving said first pointer to any desired count-set position on said dial; actuating mechanism for said second pointer, having a one-way device with companion driving and driven sections of which said driven section is turnable only in one direction and said driving section is oscillatable in advance and retract directions and spring-urged in said advance direction in which to turn said driven section, a disconnectible but normally connected operating connection between said driven section and second pointer for moving the latter in said rearward direction on turning said driven section, a cyclically operable part acting on successive parts of each cyclic operation to move said driving section in said retract direction to an invariable retracted position and permit its spring-urged movement in said advance direction, respectively, and a cam moving with said second pointer and serving as a stop for said driving section in said advance direction at distances from said retracted position which in the step-by-step movement of said second pointer from said upper limit to said lower limit of the dial range vary from smaller to larger, respectively; and means operable to disconnect said connection for independent movability of said second pointer in either direction.

8. The combination in a counter as in claim 7, in which said cam has concentric high and low lobes and a connecting ridge which serves as a stop for said driving section and also serves to transfer said driving section from stopping relation with either lobe to stopping relation with the other lobe on movement of said second pointer in opposite directions, with said high and low lobes being in stopping relation with said driving section on step-by-step movement in said rearward direction of said second pointer within upper and lower zones of said dial range which extend downwardly from said upper range limit and downwardly to said lower range limit, respectively, and said ridge being in stopping relation with said driving section on step-by-step movement in said rearward direction of said second pointer within a transit region of said dial range between said zones thereof, so that in operation of said counter said second pointer has operational steps in said rearward direction which over said transit region are of varying lengths, and which over said upper and lower range zones are of shorter and greater lengths, respectively, than said varying step lengths, with said step lengths being over the respective range zones also equal.

9. The combination in a counter as in claim 8, in which the graduations over said upper range zone are spaced at a distance equal to a multiple of said shorter step length, and the graduations over said lower range zone are spaced at a distance equal to said greater step length.

10. The combination in a counter as in claim 7, in which said graduations are arranged circularly about an axis, and said pointers are movable over said dial by being independently turnable about said axis.

11. In a counter, the combination of a dial with graduations of a given count range, with each graduation defining a full count number; a count-off pointer cooperating with and movable over said dial in opposite reset and count-off directions; actuating mechanism for said pointer, having a one-way device with companion driving and driven sections, of which said driven section is turnable only in one direction and said driving section is oscillatable in advance and retract directions and turns said driven section on movement in said advance direction, an operating connection between said driven section and pointer and including a normally engaged clutch for moving said pointer in said count-off direction on turning said driven section, a cyclically movable cam with which said driving section is in spring-urged follower engagement, said cam having first and second portions acting on successive parts of each cyclic movement to move said driving section in said retract direction to a certain retracted position and control its spring-urged movement from said retracted position in said advance direction to a certain advance position, respectively, with advance movement of said driving section from said retracted to said advance position being of a magnitude to turn said driven section for a step of said pointer in said count-off direction through a distance exactly equal to a full single count according to the dial graduations; means including a movable element and operative on movement of said element in opposite directions to disengage and reengage said clutch, respectively, so as to permit on clutch disengagement independent movement of said pointer in either direction, whereby on movement of said pointer during clutch disengagement into exact alignment with any dial graduation and on subsequent clutch reengagement while said driving section is in follower relation with said first cam portion, said pointer will on cyclic operation of said cam starting with clutch reengagement step in said count-off direction and between steps come to intermittent rest positions in which it is in exact alignment with all dial graduations it encounters.

12. The combination in a counter as in claim 11, which further comprises a count-set member against which said count-off pointer abuts on movement in said reset direction, with said count-off pointer being in exact alignment with a count-start graduation when in abutment with said member.

13. The combination in a counter as in claim 12, in which said member is a count-set pointer accurately settable to any desired count-start graduation on the dial in exact alingment therewith, and said count-off pointer is also in exact alignment with said count-start graduation when in abutment with said accurately set count-set pointer.

14. In a counter, the combination of a dial with graduations of a given count range with upper and lower zones and an intermediate transit region, of which the graduations in said upper and lower zones are spaced narrower and wider, respectively, but equally in each zone, successive graduations in said upper zones denote a certain multiple of a single count and successive graduations in said lower zone denote a smaller count than those in said upper zone, and each graduation denotes a full count number; a count-set member movable over said dial and lockable against movement from any count-set position on the dial; a count-off pointer movable over said dial in opposite reset and count-off directions toward the ends of said upper and lower zones, respectively, and being movable in said reset direction toward and into abutting engagement with said member in any count-set position in which the abutting pointer is in aligenment with a count-start graduation for which said member is set; actuating mechanism for said pointer, having a one-way device with companion driving and driven sections of which said driven section is turnable only in one direction and said driving section is oscillatable in advance and retract directions and turns said driven section on movement in said advance direction, an operating connection between said driven section and pointer and including a normally engaged clutch for moving said pointer in said count-off direction on turning said driven section, a cyclically movable cam with which said driving section is in spring-urged follower relation, said cam having first and second portions acting on successive parts of each cyclic movement to move said driving section in said retract direction to a certain retracted position and control its spring-urged movement from said retracted position in said advance direction, respectively, and a cam member moving with said pointer and serving as a stop for said driving section in said advance direction, said cam member having high and low lobes and a connecting ridge which serves as a stop for said driving section and also serves to transfer said driving section from stopping relation with said high lobe to stopping relation with said low lobe on movement of said pointer and said count-off direction, with said high lobe, ridge and low lobe being in stopping relation with said driving section in all positions of said pointer in said upper zone, transit region and lower zone, respectively, of said dial range to stop the spring-urged advance of said driving section in first, second and third advance positions at equally small, larger and equally largest distances, respectively, from its retracted position, with advance movement of said driving section into said first, second and third advance positions being of magnitudes to turn said pointer in said count-off through distances exactly equal to a full single count according to the dial graduations in said upper zone, transit region and lower zone, respectively; a preloaded spring operatively connected with said pointer to urge the latter in said reset direction and be reloaded on movement of said pointer in said count-off direction; means including a movable element and operative on movement of said element into first and second positions to disengage and reengage said clutch, respectively, whereby on clutch disengagement said spring will reset said pointer into abutting engagement with said member; and a device including a movable part and actuated in timed relation with movement of said element into said first and second positions to move said part in opposite first and second directions, respectively, in which to engage said driving section in any of said advance positions and retract it beyond reach by any part of said cam member, and to control its spring-urged advance into operative relation with said cam member, so that on a spring-forced reset of said pointer the therewith moving cam member is out of reach of said driving section.

15. The combination in a counter as in claim 14, in which said member is a count-set pointer accurately settable to any desired count-start graduation on the dial in exact alignment therewith, and said count-off pointer is also in exact alignment with said count-start graduation when in abutment with said accurately set count-set pointer.

16. The combination in a counter as in claim 14, in which said dial graduations are arranged circularly about an axis, and said member and pointer are movable over said dial by being turnable about said axis.

17. In a counter, the combination of a dial with a graduated count range with upper and lower limits; a count-set pointer movable over said dial in opposite directions into count-set position adjacent any graduation; and setting mechanism for said pointer, including a driver gear turnable about an axis and operative on rotation of said gear in opposite directions to move said pointer in said opposite directions, respectively, a shaft extending parallel to said axis and having at least a length thereof fixed against rotation, other gears of which one gear is turnable on said shaft length and the other gear is spaced from said one gear and mounted on said shaft for turnability independently of said one gear, with a first one of said other gears being in permanent mesh with said driver gear and the second of said other gears being out of mesh with said driver gear, a stem extending parallel to said shaft and being turnable and axially shiftable, said stem carrying a pinion meshing with said other gears in different axial positions of said stem, respectively, and a coil spring with unidirectional helical turns surrounding said shaft including said length thereof and being interposed between, and with its opposite ends anchored to, said other gears, with said spring turns fitting on said shaft length sufficiently snugly to bind thereon on turning either of said other gears in a direction to tighten said spring turns on said shaft length, whereby said driver gear will be turned in opposite directions on the drive by said pinion of said other gears, respectively, only in opposite directions, respectively, in which to loosen said spring turns on said shaft length.

18. The combination in a counter as in claim 17, in which said pointer is moved toward said lower limit of the dial range on the drive of said driver gear by said pinion when the latter is in mesh with said first gear, and there is further provided a count-off pointer element movable over said dial in opposite reset and count-off directions between said pointer and lower dial range, with said element being on movement in said reset direction engageable with said pointer on encountering the same, a drive for said element normally connected with but disconnectible from said element and including a cyclically operable part, said drive locking said element against movement in said reset direction but permitting such reset movement of said element when disconnected from the latter, and being operative on cyclic operation of said part to index said element in said count-off direction; a preloaded spring member operatively connected with said element to urge the latter in said reset direction and be reloaded on movement of said element in said count-off direction; and means to disengage said drive from said element for reset of the latter into engagement with said pointer by the force of said spring member, whereby on impact of said element with said pointer said spring turns immediately bind on said shaft length for no yield of said element under the force of the impact.

19. The combination in a counter as in claim 17, which further provides a count-off pointer element movable over said dial in opposite reset and count-off directions between said pointer and lower dial range limit, with said pointer and element being in each other's path on relative movement toward each other; actuating mechanism for said element, having a one-way device with companion driving and driven sections of which said driven section is turnable only in one direction, and an operating connection between said driven section and element and including a normally engaged clutch for moving said element in said count-off direction toward said lower dial range on turning said driven section, with said driving section being cyclically operable and acting on each cyclic operation to turn said driven section one step; a preloaded spring member operatively connected with said element to urge the latter in said reset direction and be reloaded on movement of said element in said count-off direction, with said pointer being moved toward said lower limit of the dial range on the drive of said driver gear by said pinion when the latter is in mesh with said first gear, and means operated on movement of said stem into a certain position in which its pinion is in mesh with said second gear to disengage said clutch and permit reengagement of the latter on movement of said stem from said certain position, whereby on movement of said stem into said certain position said element is by said spring member reset into abutment with said pointer, and said element will be spring-urged into following relation and move with said pointer if said stem is in said certain position turned to effect movement of said pointer toward said upper dial range limit.

20. The combination in a counter as in claim 19, in which said operating connection is of speed-reduction type with said driven section being the fastest element of the connection, and said clutch is of friction type and a slower element of said connection than said driven section, with said clutch offering the least resistance and slipping if said element is encountered by and swept along with said pointer when moved toward said lower dial range limit.

21. In a counter, the combination of a count-off element movable in opposite reset and count-off directions to and from one limit of a count-off range; actuating mechanism for said element, having a one-way device with companion driving and driven sections, of which said driven section is turnable only in one direction and said driving section is oscillatable in advance and retract directions and spring-urged in said advance direction in which to turn said driven section, a disconnectible but normally connected operating connection between said driven section and element for moving the latter in said count-off direction on turning said driven section, a cyclically operable part acting on successive parts of each cyclic operation to move said driving section in said retract direction to an invariable retracted position and permit its spring-urged movement in said advance direction, respectively, and a cam turning with said element and serving as a stop for said driving section in said advance direction at distances from said retract position which vary in the movement of said element in count-off direction from said one limit of said range; and means operable to disconnect said connection for movability of said element in said reset direction.

References Cited

UNITED STATES PATENTS

| | | | |
|---|---|---|---|
| 2,406,726 | 8/1946 | Weimont | 235—132 |
| 2,868,456 | 1/1959 | King | 235—132 |

RICHARD B. WILKINSON, *Primary Examiner.*

LAWRENCE R. FRANKLIN, *Assistant Examiner.*